US012810671B2

(12) United States Patent
Johansson et al.

(10) Patent No.: US 12,810,671 B2
(45) Date of Patent: Nov. 24, 2026

(54) SYSTEM, METHOD AND COMPUTER PROGRAM PRODUCT FOR MANAGING ACCESS TO A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Magnus Nilsson, Floda (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 323 days.

(21) Appl. No.: 18/637,121

(22) Filed: Apr. 16, 2024

(65) Prior Publication Data

US 2024/0267962 A1 Aug. 8, 2024

Related U.S. Application Data

(63) Continuation of application No. PCT/CN2022/125326, filed on Oct. 14, 2022.

(30) Foreign Application Priority Data

Oct. 18, 2021 (EP) .................................... 21203236

(51) Int. Cl.
*G07C 9/00* (2020.01)

(52) U.S. Cl.
CPC ..... *G07C 9/00571* (2013.01); *G07C 9/00182* (2013.01); *G07C 2009/00793* (2013.01); *G07C 2209/63* (2013.01)

(58) Field of Classification Search
CPC ........... G07C 9/00571; G07C 9/00182; G07C 2009/00793; G07C 2209/63
(Continued)

(56) References Cited

U.S. PATENT DOCUMENTS

2010/0217457 A1 8/2010 Georgi
2016/0171855 A1* 6/2016 Luke ...................... G06Q 10/20 340/539.13

(Continued)

FOREIGN PATENT DOCUMENTS

WO 2018071671 A2 4/2018
WO WO-2020088487 A1 * 5/2020 ............. G08B 21/24

*Primary Examiner* — Kam Wan Ma
(74) *Attorney, Agent, or Firm* — Tucker Ellis LLP

(57) ABSTRACT

An access system for managing access to a vehicle includes a first wireless communication unit arranged at the vehicle configured to detect a wireless key via a radio communication interface, a processing circuitry connected to the first wireless communication unit, and configured to cause the access system to establish, by the first wireless communication unit, wireless communication with a second wireless communication unit arranged remote from the vehicle, receive, by the first wireless communication unit, a response signal indicative of the presence of the wireless key within the radio coverage area of the second wireless communication unit, and manage access to the vehicle based on the presence of the wireless key within the radio coverage area of the first wireless communication unit and/or the second wireless communication unit.

14 Claims, 6 Drawing Sheets

(58) Field of Classification Search
USPC .......................................................... 340/5.61
See application file for complete search history.

(56) References Cited

U.S. PATENT DOCUMENTS

| | | | | |
|---|---|---|---|---|
| 2018/0025639 | A1* | 1/2018 | Lin | G08G 1/0965 340/901 |
| 2018/0174452 | A1 | 6/2018 | Draper | |
| 2020/0346618 | A1 | 11/2020 | Steegmann | |
| 2021/0027130 | A1* | 1/2021 | Ette | G07C 9/00309 |
| 2021/0241602 | A1* | 8/2021 | Nilsson | B60R 25/245 |

* cited by examiner

SYSTEM, METHOD AND COMPUTER PROGRAM PRODUCT FOR MANAGING ACCESS TO A VEHICLE

RELATED APPLICATION DATA

This application is a continuation of International Patent Application No. PCT/CN2022/125326, filed Oct. 14, 2022, which claims the benefit of European Patent Application Ser. No. 21203236.1, filed Oct. 18, 2021, the disclosures of which are incorporated herein by reference in their entireties.

TECHNICAL FIELD

The present disclosure relates to an access system for managing access to a vehicle, a method for managing access to a vehicle and a computer program product.

BACKGROUND

Today it is common to use wireless keys for unlocking and locking vehicles. In order to e.g. unlock the vehicle the wireless key needs to be in the vicinity of the vehicle and not shielded in order to establish communication with the vehicle.

Sometimes the radio signal from the wireless key is not easily detected, or not detected at all, by the vehicle dependent on that the wireless key is e.g. shielded or placed such that the possibility to establish a wireless connection with the vehicle is reduced or even eliminated. A user often then picks up the wireless key or at least rearrange the location of the wireless key, e.g. rearrange items in a pocket or in a bag in order to put the wireless key where the wireless key can establish connection with the vehicle.

Users may not always know the reason why the wireless key is not working as it should. This can cause irritation and frustration.

SUMMARY

A common use of current wireless keys is that the access control for managing access to a vehicle, is based on the signal strength of the wireless key in order to determine the distance to the wireless key.

A predefined distance is often needed in order for allowing locking and unlocking the vehicle. However, if the wireless key is shielded, e.g. by a device for protecting contactless credit cards from being read in your wallet, or by a laptop in a suitcase, or any other item that blocks electromagnetic fields, the wireless key will be perceived to be too far away and unlocking will not always be performed even if the wireless key is in the vicinity of the vehicle.

It is an object of the present disclosure to mitigate, alleviate or eliminate one or more of the above-identified deficiencies and disadvantages in the prior art and solve at least the above mentioned problem.

According to a first aspect there is provided an access system for managing access to a vehicle. The access system comprises a first wireless communication unit arranged at the vehicle configured to detect a wireless key via a radio communication interface. The access system further comprises a processing circuitry connected to the first wireless communication unit, and configured to cause the access system to establish, by the first wireless communication unit, wireless communication with a second wireless communication unit arranged remote from the vehicle, receive, by the first wireless communication unit, a response signal indicative of the presence of the wireless key within the radio coverage area of the second wireless communication unit, and manage access to the vehicle based on the presence of the wireless key within the radio coverage area of the first wireless communication unit and/or the second wireless communication unit.

One advantage with this first aspect is that in a determination that the wireless key is within the radio coverage area of the second wireless communication unit, the access system can manage access to the vehicle based on the fact that the wireless key is within the radio coverage area of the second wireless communication.

According to some embodiments, the presence of the wireless key within the radio coverage area of the first wireless communication unit and/or the second wireless communication unit is based on radio signal strength data.

One advantage with this embodiment is that the presence of the wireless key can be determined based on the characteristics of the radio communication interface of the first wireless communication unit and/or the second wireless communication unit.

According to some embodiments, the processing circuitry is further configured to cause the access system to detect the presence of a wireless key within a radio coverage area of the first wireless communication unit.

One advantage with this embodiment is that it can be established that a wireless key is within a radio coverage area of the first wireless communication unit and hence within a certain distance from the vehicle based on the characteristics of the radio communication interface of the first wireless communication unit.

According to some embodiments, the processing circuitry is further configured to cause the access system to determine the position of the wireless key relative to the first wireless communication unit and relative to the second wireless communication unit arranged remote from the vehicle.

One advantage with this embodiment is that a relative position of the wireless key based on the location of the first wireless communication unit and the second wireless communication unit can be determined based on the characteristics of the radio communication interface of the first and second wireless communication units.

According to some embodiments, the processing circuitry is further configured to cause the access system to determine a wireless key identity of the wireless key, and send, from the first wireless communication unit to the second wireless communication unit, a request signal indicative of the wireless key identity of the wireless key to determine the presence of the wireless key within a radio coverage area of the second wireless communication unit.

One advantage with this embodiment is that it can be determined if the wireless key, with the certain wireless key identity, is within the radio coverage area of the second wireless communication unit which is an indication that the wireless key, with the certain wireless key identity, is in the vicinity of the second wireless communication unit.

According to some embodiments, the access system further comprises a first global positioning system unit arranged at the vehicle configured to determine the geographical position of the first wireless communication unit, and the processing circuitry is further configured to cause the access system to determine the geographical position of the first wireless communication unit by the first global positioning system unit, receive, via the response signal, data indicative of the geographical position of the second wireless communication unit, and determine the position of the wireless key based on the geographical position of the first wireless communication unit and the geographical position of the second wireless communication unit, and based on the presence of the wireless key being within the radio coverage area of the first wireless communication unit and the second wireless communication unit.

One advantage with this embodiment is that it can be determined that the wireless key is within a certain distance from the vehicle based on the radio coverage area of the first wireless communication unit and the second wireless communication unit based on the characteristics of the radio communication interface of the first and second wireless communication units, and together with the information about the geographical positions of the first and second wireless communication units it can be further determined where the radio coverage areas of the first wireless communication unit and the second wireless communication unit intersects and overlaps.

According to some embodiments, the processing circuitry is further configured to cause the access system to establish, by the first wireless communication unit, wireless communication with plural wireless communication units arranged remote from the vehicle, and receive, by the first wireless communication unit, plural response signals indicative of the presence of the wireless key within the radio coverage area of the plural wireless communication units arranged remote from the vehicle, and determine the position of the wireless key relative to the first wireless communication unit and relative to the plural wireless communication units arranged remote from the vehicle.

One advantage with this embodiment is that a more accurate determination of the position of the wireless key relative to the first wireless communication unit and relative to the plural wireless communication units can be performed.

According to some embodiments, the processing circuitry is further configured to cause the access system to determine plural positions of the wireless key, determine that one distance between the plural positions of the wireless key is outside of a predetermined acceptable threshold distance value for determining the position of the wireless key, and issue a warning signal indicative of duplication of the wireless key.

One advantage with this embodiment is that fraud can be detected since it is determined that more than one wireless key seems present, e.g. due to an attempted signal duplication, and thereby avoid giving access to an intruder.

According to some embodiments, the first wireless communication unit is configured to re-establish wireless communication with the second wireless communication unit within a predetermined time period from previous establishment of wireless communication with the second wireless communication unit, and receive a further response signal to manage access to the vehicle.

One advantage with this embodiment is that multiple response signals can be used for determining presence of the wireless key within the radio coverage area of the first wireless communication unit and/or the second wireless communication unit over time which is useful if the second wireless communication unit is moving in relation to the first wireless communication unit and in relation to the wireless key.

According to a second aspect there is provided a method for managing access to a vehicle. The method comprising the step of establishing, by the first wireless communication unit, wireless communication with a second wireless communication unit arranged remote from the vehicle, the step of receiving, by the first wireless communication unit, a response signal indicative of the presence of the wireless key within the radio coverage area of the second wireless communication unit, and the step of managing access to the vehicle based on the presence of the wireless key within the radio coverage area of the first wireless communication unit and/or the second wireless communication unit.

One advantage with this second aspect is that in a determination that the wireless key is within the radio coverage area of the second wireless communication unit, the access system can manage access to the vehicle based on the fact that the wireless key is within the radio coverage area of the second wireless communication.

According to some embodiments, the method further comprises the step of detecting a presence of a wireless key within a radio coverage area of a first wireless communication unit.

One advantage with this embodiment is that it can be established that a wireless key is within a radio coverage area of the first wireless communication unit and hence within a certain distance from the vehicle based on the characteristics of the radio communication interface of the first wireless communication unit.

According to some embodiments, the method further comprises the step of determining the position of the wireless key relative to the first wireless communication unit and relative to the second wireless communication unit arranged remote from the vehicle.

One advantage with this embodiment is that a relative position of the wireless key based on the location of the first wireless communication unit and the second wireless communication unit can be determined based on the characteristics of the radio communication interface of the first and second wireless communication units.

According to some embodiments, the method further comprises the step of determining a wireless key identity of the wireless key, and sending, from the first wireless communication unit to the second wireless communication unit, a request signal indicative of the wireless key identity of the wireless key to determine the presence of the wireless key within a radio coverage area of the second wireless communication unit.

One advantage with this embodiment is that it can be determined if the wireless key, with the certain wireless key identity, is within the radio coverage area of the second wireless communication unit which is an indication that the wireless key, with the certain wireless key identity, is in the vicinity of the second wireless communication unit.

According to some embodiments, the method further comprises the step of determining the geographical position of the first wireless communication unit by the first global positioning system unit, the step of receiving, via the response signal, data indicative of the geographical position of the second wireless communication unit, and the step of determining the position of the wireless key based on the geographical position of the first wireless communication unit and the geographical position of the second wireless communication unit, and based on the presence of the wireless key being within the radio coverage area of the first wireless communication unit and the second wireless communication unit.

One advantage with this embodiment is that it can be determined that the wireless key is within a certain distance from the vehicle based on the radio coverage area of the first wireless communication unit and the second wireless communication unit based on the characteristics of the radio communication interface of the first and second wireless communication units, and together with the information about the geographical positions of the first and second wireless communication units it can be further determined where the radio coverage areas of the first wireless communication unit and the second wireless communication unit intersect.

According to a third aspect there is provided a computer program product comprising a non-transitory computer readable medium, having thereon a computer program comprising program instructions, the computer program being loadable into a processing circuitry and configured to cause execution of the method when the computer program is run by the processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION OF EXAMPLE EMBODIMENTS

The present disclosure will now be described with reference to the accompanying drawings, in which preferred example embodiments of the disclosure are shown. The disclosure may however, be embodied in other forms and should not be construed as limited to the herein disclosed embodiments. The disclosed embodiments are provided to fully convey the scope of the disclosure to the skilled person.

Today it is common to use wireless keys for unlocking and locking vehicles. In order to e.g. unlock the vehicle the wireless key needs to be in the vicinity of the vehicle and not shielded in order to establish communication with the vehicle.

Sometimes a radio signal from a wireless key is not easily detected, or not detected at all, by the vehicle dependent on that the wireless key is e.g. shielded or placed such that the communication with the vehicle is reduced or eliminated.

Figure 1:
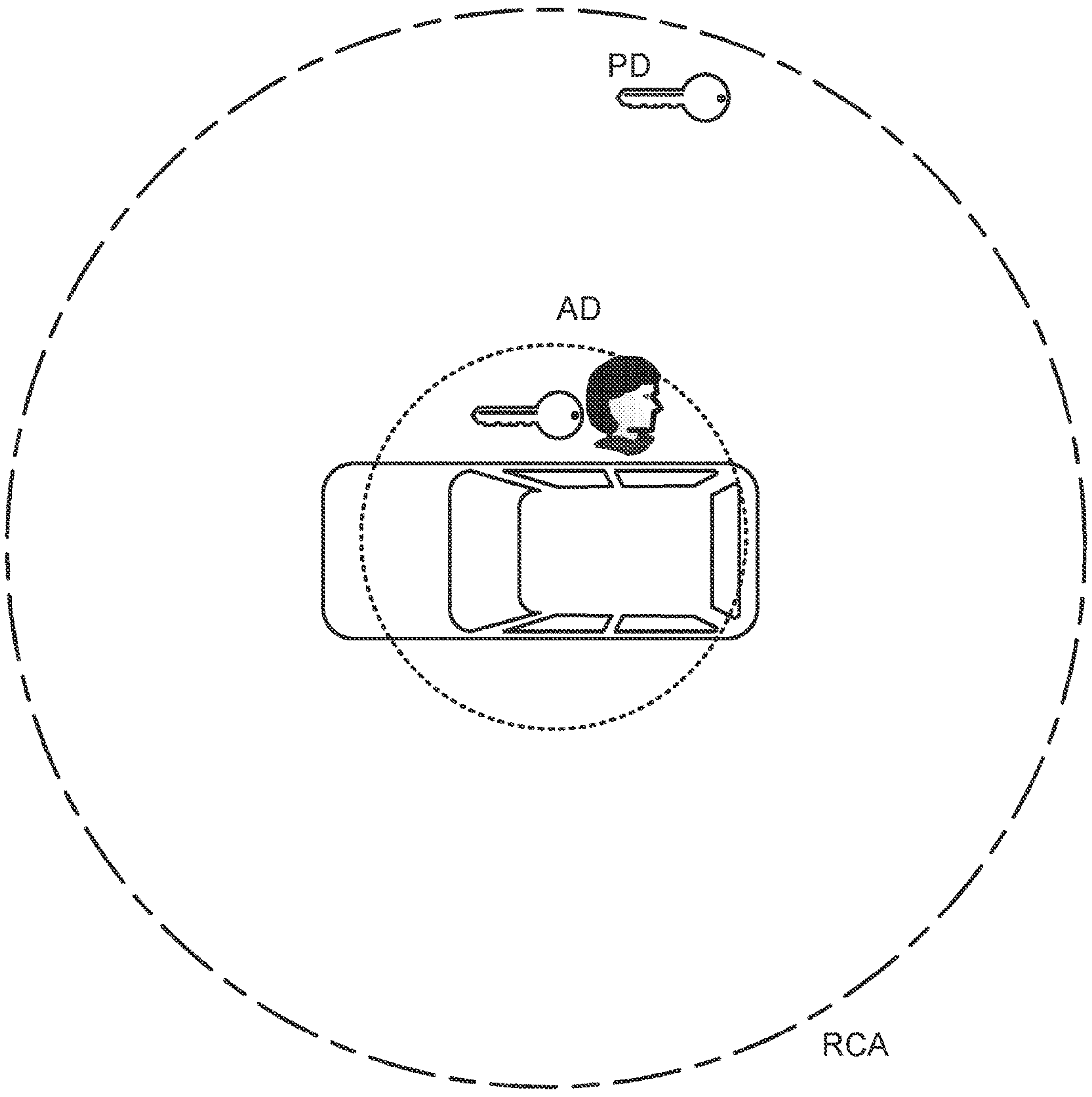
FIG. 1 illustrates an example perceived distance and an example actual distance of a wireless key in the vicinity of a vehicle.

FIG. 1 illustrates a vehicle and a user with a wireless key that is in the vicinity of the vehicle. The actual distance AD of the wireless key in relation to the vehicle is however not the same as the perceived distance PD due to that the wireless key is shielded or placed such that the communication with the wireless communication unit of the vehicle is reduced or eliminated.

The wireless communication unit of the vehicle instead perceives the wireless key to be far away from the vehicle, illustrated with the perceived distance PD in FIG. 1, due to a weak received radio signal strength from the wireless key, e.g. close to the theoretical radio coverage area RCA of the wireless communication unit that is defined based on the characteristics of the radio communication interface between the wireless key and the wireless communication unit of the vehicle, as illustrated in FIG. 1.

In an example the vehicle will not unlock the due to that the wireless key seems to be too far away from the vehicle. In order to unlock the vehicle, the user has to pick up the wireless key or at least rearrange the location of the wireless key, e.g. rearrange items in a pocket or in a bag in order to put the wireless key where the wireless key can establish connection with the vehicle.

The inventors have come up with a solution that will solve the problem with unlocking the vehicle in the example situation as previously described, but also for other use cases as will be presented in this disclosure.

Figure 2:
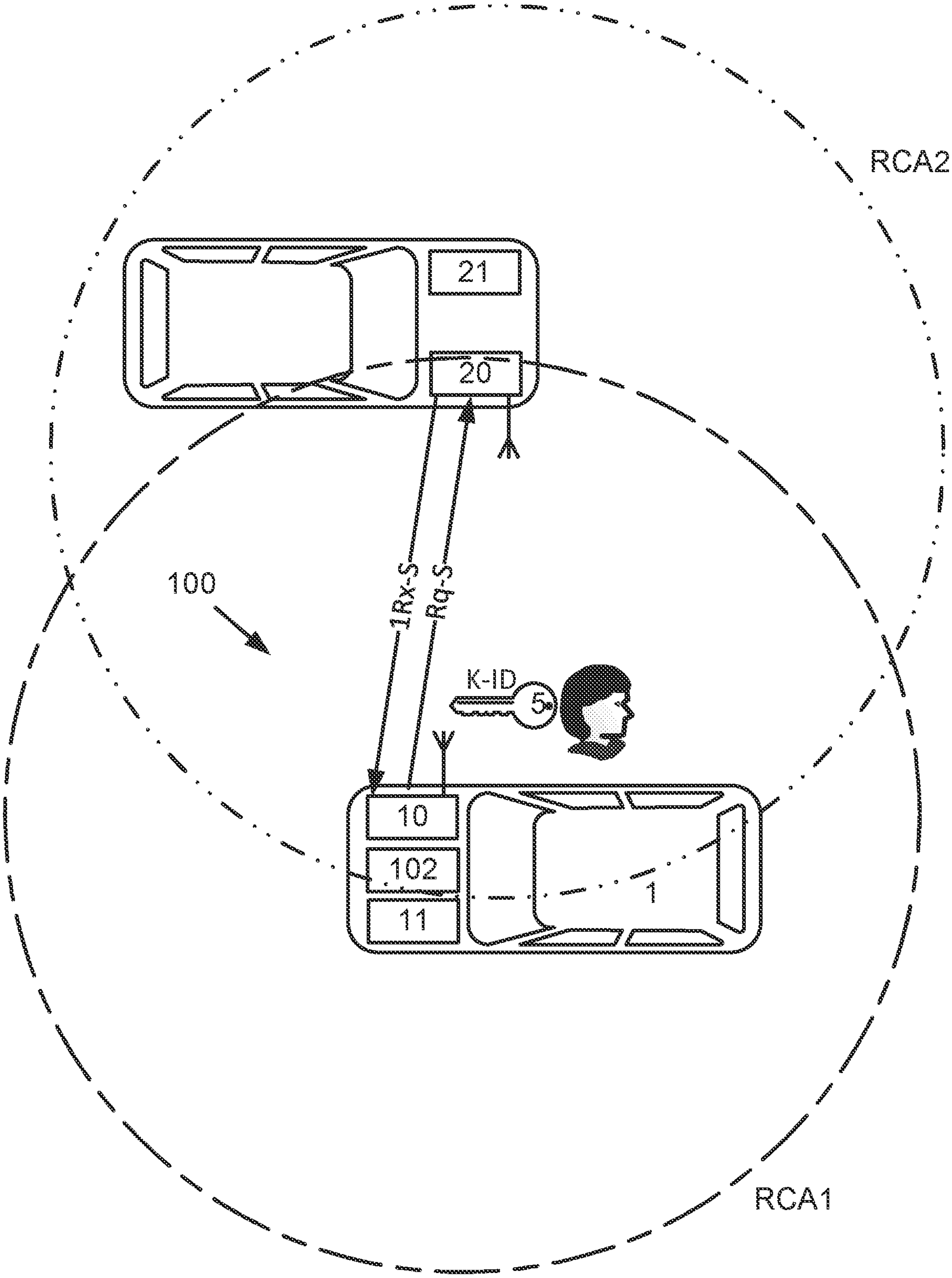
FIG. 2 illustrates an example access system for managing access to a vehicle by a first wireless communication unit establishing wireless communication with a second wireless communication unit according to some embodiments of the present disclosure.

FIG. 2 illustrates an example access system for managing access to a vehicle by a first wireless communication unit 10 establishing wireless communication with a second wireless communication unit 20 according to some embodiments of the present disclosure.

The first aspect of this disclosure, as illustrated in FIG. 2, shows an access system 100 for managing access to a vehicle 1. The access system 100 comprises a first wireless communication unit 10 arranged at the vehicle 1 configured to detect a wireless key 5 via a radio communication interface.

The access system 100 further comprises a processing circuitry 102 connected to the first wireless communication unit 10, and configured to cause the access system 100 to establish, by the first wireless communication unit 10, wireless communication with a second wireless communication unit 20 arranged remote from the vehicle 1, receive, by the first wireless communication unit 10, a response signal 1Rx-S indicative of the presence of the wireless key 5 within the radio coverage area of the second wireless communication unit 20, and manage access to the vehicle 1 based on the presence of the wireless key 5 within the radio coverage area of the first wireless communication unit 10 and/or the second wireless communication unit 20.

According to some embodiments the first wireless communication unit 10 is configured to detect the wireless key 5 via a local area radio communication interface and configured to establish communication with the second wireless communication unit 20 via a wide area radio communication interface.

According to some embodiments the second wireless communication unit 20 is configured to detect the wireless key 5 via a local area radio communication interface and configured to establish communication with the first wireless communication unit 10 via a wide area radio communication interface.

According to some embodiments the local area radio communication interface, is a standardized wireless local area network such as a Wireless Local Area Network, WLAN, Bluetooth™, ZigBee, Ultra-Wideband, Near Field Communication, NFC, Radio Frequency Identification, RFID, or similar network.

According to some embodiments the wide area radio communication interface is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network.

According to some embodiments the local area radio communication interface has a shorter radio coverage area than the wide area radio communication interface.

According to some embodiments the radio coverage area of the local area radio communication interface is predefined based on the characteristics of the local area radio communication interface. According to some embodiments the radio coverage area of the local area radio communication is less than 15 meters.

According to some embodiments the establishment of wireless communication by the first wireless communication unit 10 and the second wireless communication unit 20 is based on a vehicle-to-vehicle V2V communication interface.

According to some embodiments the establishment of wireless communication by the first wireless communication unit 10 and the second wireless communication unit 20 is based on a vehicle-to-everything V2X communication interface such as a vehicle-to-infrastructure V2I communication interface, a vehicle-to-pedestrian V2P communication interface, or a vehicle-to-device V2D communication interface. According to some embodiments the second wireless communication unit 20 is at least any of a mobile phone, a tablet, a portable computer, a smartwatch, a home network device, a charging post etc.

According to some embodiments the first wireless communication unit 10 only establishes wireless communication with the second wireless communication unit 20 if the second wireless communication unit 20 is a trusted device.

According to some embodiments the processing circuitry 102 is further configured to determine if the second wireless communication unit 20 is a trusted device. According to some embodiments a trusted device is a predetermined device configured to allow establishment of wireless communication between the first wireless communication unit 10 and the second wireless communication unit 20. An example of a trusted device is e.g. an electronic device of a family member such as a mobile phone, a tablet, a portable computer or a smart watch. According to some embodiments a trusted device is a device acceptable for establishing wireless communication with the access system 100. Further examples of trusted devices are e.g. vehicles of the same vehicle brand, vehicles running the same operating system, or devices associated with a social application, or a network of devices belonging to a system of trusted devices.

In the example illustration of FIG. 2 the second wireless communication unit 20 is arranged at a nearby vehicle.

According to some embodiments the characteristics of the radio communication interface of the first wireless communication unit 10 and/or the second wireless communication unit 20 defines a theoretical radio coverage area of the first wireless communication unit 10 and/or the second wireless communication unit 20. FIG. 2 illustrates the radio coverage area of the first wireless communication unit RCA1 and the radio coverage area of the second wireless communication unit RCA2.

In an example the illustrated radio coverage area of the first wireless communication unit RCA1 and the radio coverage area of the second wireless communication unit RCA2 in FIG. 2, are the radio cover areas when the wireless key 5 is not shielded but can establish communication with the first wireless communication unit 10 and/or the second wireless communication unit 20 as if the wireless key 5 had a free line of sight to the first wireless communication unit 10 and/or the second wireless communication unit 20.

The radio wave propagation can of course be influenced by objects that are in between the wireless key 5 and the first wireless communication unit 10 and/or the second wireless communication unit 20 which reduces the radio coverage area of the first wireless communication unit 10 and/or the second wireless communication unit 20.

One advantage with this first aspect is that in a determination that the wireless key 5 is within the radio coverage area of the second wireless communication unit RCA2, the access system 100 can manage access to the vehicle 1 based on the fact that the wireless key 5 is within the radio coverage area of the second wireless communication unit RCA2.

In an example, the wireless key 5 is not within the radio coverage area of the first wireless communication unit RCA1 due to shielding of the wireless key 5, even if the wireless key 5 is in the physical vicinity of the vehicle 1, but in a determination that the wireless key 5 is within the radio coverage area of the second wireless communication unit RCA2, the access system can manage access to the vehicle 1.

According to some embodiments the presence of the wireless key 5 within the radio coverage area of the first wireless communication unit 10 and/or the second wireless communication unit 20 is based on radio signal strength data.

According to some embodiments the radio signal strength data comprises a Received Signal Strength Indicator, RSSI, value determined by measurement of power present in a received radio signal at the first wireless communication unit 10 and/or the second wireless communication unit 20. Even if the Received Signal Strength Indicator, RSSI, value can be affected by other factors than distance, the Received Signal Strength Indicator, RSSI, is one way of determining the presence of the wireless key 5 in the vicinity of the first wireless communication unit 10 and/or determining the presence of the wireless key 5 in the vicinity of the second wireless communication unit 20.

According to some embodiments a predefined Received Signal Strength Indicator, RSSI threshold value determines the presence of the wireless key 5 within the radio coverage area of the first wireless communication unit 10 and/or the second wireless communication unit 20.

One advantage with this embodiment is that the presence of the wireless key 5 can be determined based on the characteristics of the radio communication interface of the first wireless communication unit 10 and/or the second wireless communication unit 20.

According to some embodiments the processing circuitry 102 is further configured to cause the access system 100 to detect the presence of a wireless key 5 within a radio coverage area of the first wireless communication unit 10.

According to some embodiments the processing circuitry 102 is further configured to cause the access system 100 to detect the presence of a wireless key within a radio coverage area of the first wireless communication unit RCA1 based on an determination of a presence signal indicative of that wireless key within a radio coverage area of the first wireless communication unit RCA1.

According to some embodiments the presence signal is a radio signal. According to some embodiments the presence signal comprises detection of any radio signal on a predefined radio frequency.

According to some embodiments the presence signal comprises at least a part of a wireless key identity.

According to some embodiments the presence signal comprises a generic wireless key indicator signal.

According to some embodiments the presence signal comprises an anonymous wireless key identity data.

One advantage with this embodiment is that it can be established that a wireless key is within a radio coverage area of the first wireless communication unit RCA1 and hence within a certain distance from the vehicle 1 based on the characteristics of the radio communication interface of the first wireless communication unit 10.

According to some embodiments the processing circuitry 102 is further configured to cause the access system 100 to determine the position of the wireless key 5 relative to the first wireless communication unit 10 and relative to the second wireless communication unit 20 arranged remote from the vehicle 1.

One advantage with this embodiment is that a relative position of the wireless key 5 based on the location of the first wireless communication unit 10 and the second wireless communication unit 20 can be determined based on the characteristics of the radio communication interface of the first wireless communication unit 10 and based on the characteristics of the radio communication interface of the second wireless communication unit 20.

According to some embodiments the processing circuitry 102 is further configured to cause the access system 100 to determine a wireless key identity K-ID of the wireless key 5, and send, from the first wireless communication unit 10 to the second wireless communication unit 20, a request signal Rq-S indicative of the wireless key identity K-ID of the wireless key 5 to determine the presence of the wireless key 5 within a radio coverage area of the second wireless communication unit 20.

One advantage with this embodiment is that it can be determined if the wireless key 5, with the certain wireless key identity K-ID, is within the radio coverage area of the second wireless communication unit RCA2, which is an indication that the wireless key 5, with the certain wireless key identity, is in the vicinity of the second wireless communication unit 20.

FIG. 2 illustrates the request signal Rq-S, indicative of the wireless key identity K-ID, send from the first wireless communication unit 10 to the second wireless communication unit 20.

According to some embodiments the request signal Rq-S indicative of the wireless key identity K-ID is sent from the first wireless communication unit 10 and configured to be received by plural wireless communication units arranged within the radio coverage area of the first wireless communication unit RCA1. In the illustration in FIG. 2 only the second wireless communication unit 20 receives the request signal Rq-S but it is understood that the request signal Rq-S is sent wirelessly omnidirectional in relation to the first wireless communication unit 10.

According to some embodiments the request signal Rq-S, indicative of the wireless key identity K-ID of the wireless key 5, is sent via a wide area radio communication interface of the first wireless communication unit 10.

According to some embodiments, the processing circuitry 102 is further configured to cause the access system 100 to determine at least a part of a wireless key identity K-ID of the wireless key 5, and send, from the first wireless communication unit 10 to the second wireless communication unit 20, a request signal indicative of the at least part of the wireless key identity K-ID of the wireless key 5 to determine the presence of a wireless key with a wireless key identity K-ID corresponding to the at least part of the wireless key identity K-ID within a radio coverage area of the second wireless communication unit 10.

In an example only a part of the wireless key identity K-ID of the wireless key is received at the first wireless communication unit 10, and the request signal comprises the part of the wireless key identity K-ID in order to get a response if a wireless key with a wireless key identity K-ID that partly corresponds to the at least part of the wireless key identity is within a radio coverage area of the second wireless communication unit 20.

According to some embodiments the request signal Rq-S indicative of at least a part of the wireless key identity K-ID of the wireless key 5 is sent in accordance with a determination of that at least part of the wireless key identity K-ID is received by the first wireless communication unit 10.

According to some embodiments the wireless key identity K-ID of the wireless key 5 is predetermined by the access system 100. According to some embodiments the access system 100 is associated with at least a first wireless key identity K-ID of the wireless key 5 for for managing access to a vehicle 1.

According to some embodiments the request signal Rq-S indicative of at least a part of the wireless key identity K-ID of the wireless key 5 is sent in accordance with a determination of that a door handle of the vehicle 1 is touched or pulled.

According to some embodiments the request signal Rq-S indicative of at least a part of the wireless key identity K-ID of the wireless key 5 is sent regularly according to a predefined time interval.

According to some embodiments the request signal Rq-S indicative of at least a part of the wireless key identity K-ID of the wireless key 5 is sent in accordance with a determination of that a user is approaching the vehicle. According to some embodiments the user approaching the vehicle is identified using face recognition.

According to some embodiments the wireless key identity K-ID is a part of a complete wireless key identity K-ID and the request signal Rq-S indicative of the wireless key identity K-ID of the wireless key 5 is indicative of a request for responding with the complete wireless key identity K-ID in a determination that the presence of a wireless key that has a key identity that partly corresponds to the part of the complete wireless key identity K-ID is present within a radio coverage area of the second wireless communication unit 20.

One advantage with this embodiment is that the complete wireless key identity K-ID is not revealed by the access system 100 in the request signal Rq-S in order to minimize potential fraud of the complete wireless key identity K-ID.

According to some embodiments the access system 100 further comprises a first global positioning system unit 11 arranged at the vehicle 1 configured to determine the geographical position of the first wireless communication unit 10, and the processing circuitry 102 is further configured to cause the access system 100 to determine the geographical position of the first wireless communication unit 10 by the first global positioning system unit 11, receive, via the response signal Rx-S, data indicative of the geographical position of the second wireless communication unit 20, and determine the position of the wireless key 5 based on the geographical position of the first wireless communication unit 10 and the geographical position of the second wireless communication unit 20, and based on the presence of the wireless key 5 being within the radio coverage area of the first wireless communication unit 10 and the second wireless communication unit 20.

One advantage with this embodiment is that it can be determined that the wireless key 5 is within a certain distance from the vehicle 1 based on the radio coverage areas of the first wireless communication unit 10 and the second wireless communication unit 20 based on the characteristics of the radio communication interface of the first and second wireless communication units, and together with the information about the geographical positions of the first and second wireless communication units, it can be further determined where the radio coverage areas of the first wireless communication unit and the second wireless communication unit intersects and generates overlapping coverage areas.

According to some embodiments the processing circuitry 102 is further configured to receive data indicative of the geographical position of at least a second wireless communication unit 20, 30 wherein the data indicative of the geographical position of the at least a second wireless communication unit 20, 30 is obtained by a global positioning system unit 21, 31 arranged at the at least second wireless communication unit 20, 30 and configured to determine the geographical position of the at least second wireless communication unit 20, 30. In the example illustrations in FIGS. 2, 3A, 3B and 4 illustrates global positioning system units 21, 31.

According to some embodiments the data indicative of the geographical position of at least a second wireless communication unit 20, 30 is static position data. In an example the at least second wireless communication unit 20, 30 a stationary wireless communication unit such as a wireless communication unit arranged at a charging post.

In the example illustration of FIG. 2 the overlapping coverage areas of the radio coverage areas of the first wireless communication unit 10 and the second wireless communication unit 20 are between the vehicles.

FIG. 2 further illustrates where the radio coverage areas of the first wireless communication unit and the second wireless communication unit intersects by the part of the circles that are overlapping. With the knowledge of the geographical positions of the first and second wireless communication units it can be further determined where the radio coverage areas of the first wireless communication unit and the second wireless communication unit intersect and overlaps, and hence the geographical position of the wireless key 5 can be determined and used for managing access to the vehicle 1.

In the example illustration of FIG. 2 the wireless key 5 is perceived to be somewhere in the peripheral of the radio coverage areas of the first wireless communication unit RCA1 due to shielding of the wireless key 5. However the wireless key 5 is also within the radio coverage area of the second wireless communication unit RCA2, and it can hence be determined that the wireless key 5 is located somewhere in the overlapping area, where the radio coverage areas of the first wireless communication unit and the second wireless communication unit overlaps.

According to some embodiments the processing circuitry 102 is further configured to cause the access system 100 to establish, by the first wireless communication unit 10, wireless communication with plural wireless communication units 20, 30 arranged remote from the vehicle 1, and receive, by the first wireless communication unit 10, plural response signals 1Rx-S, 2Rx-S, 3Rx-S indicative of the presence of the wireless key 5 within the radio coverage area of the plural wireless communication units 20, 30 arranged remote from the vehicle 1, and determine the position of the wireless key 5 relative to the first wireless communication unit 10 and relative to the plural wireless communication units 20, 30 arranged remote from the vehicle 1.

Figure 3A:
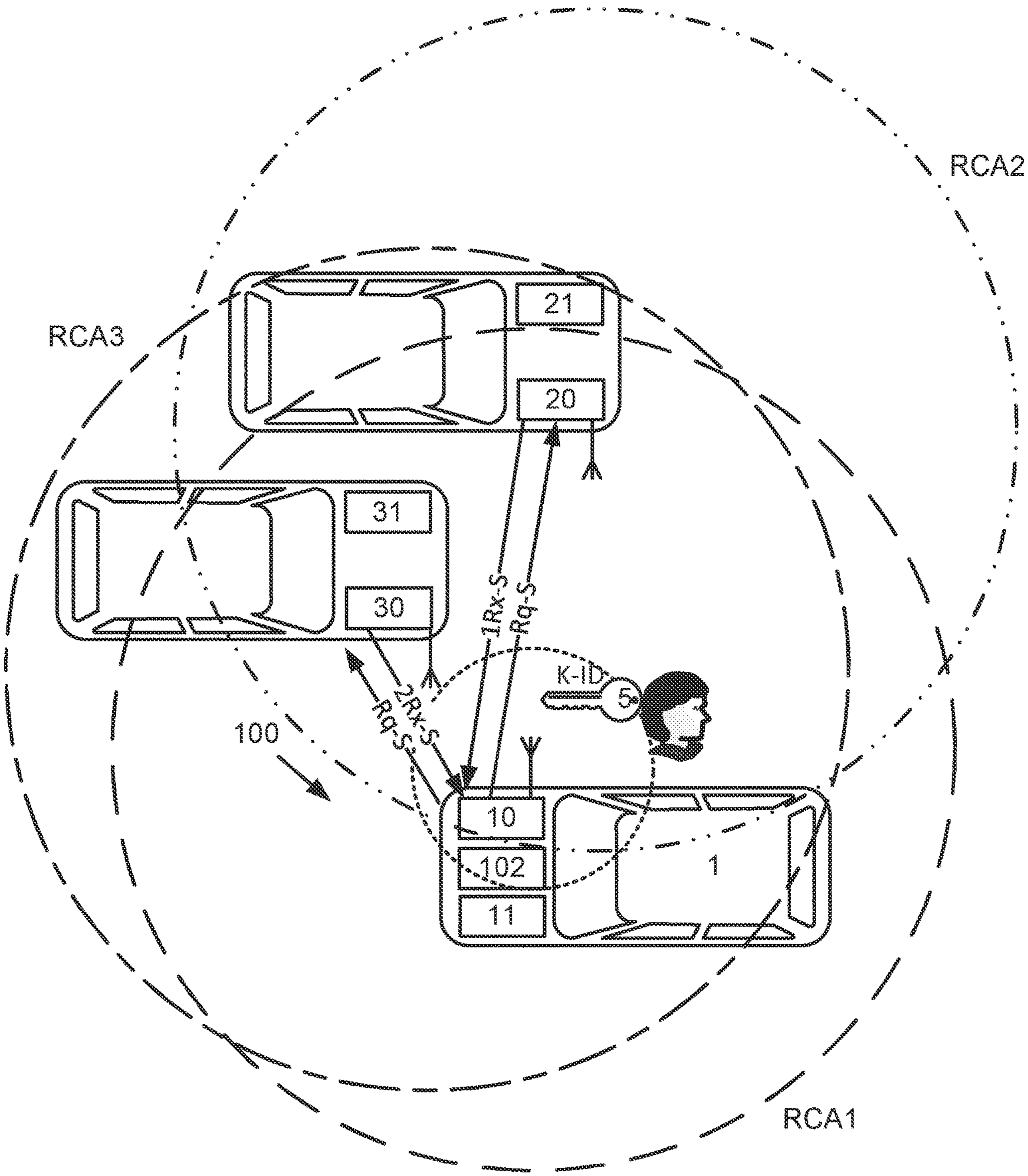
FIG. 3A illustrates an example access system for managing access to a vehicle by a first wireless communication unit establishing wireless communication with plural wireless communication units according to some embodiments of the present disclosure.

FIG. 3A illustrates an example access system 100 for managing access to a vehicle by a first wireless communication unit 10 establishing wireless communication with plural wireless communication units 20, 30 according to some embodiments of the present disclosure. The overlapping radio coverage areas of the plural wireless communication units 20, 30, illustrated by RCA2, RCA3 in FIG. 3A defines a more accurate determination of the position of the wireless key 5 in relation to the vehicle 1.

According to some embodiments the determination of the position of the wireless key 5 is based on triangulation of received signals of the wireless key 5 at the plural wireless communication units 20, 30.

One advantage with this embodiment is that a more accurate determination of the position of the wireless key 5 relative to the first wireless communication unit 10 and relative to the plural wireless communication units 20, 30 can be performed.

According to some embodiments the processing circuitry 102 is further configured to cause the access system 100 to determine plural positions of the wireless key 5, determine that one distance L between the plural positions of the wireless key 5 is outside of a predetermined acceptable threshold distance value ATDV for determining the position of the wireless key 5, and issue a warning signal indicative of duplication of the wireless key 5.

According to some embodiments the predetermined acceptable threshold distance value ATDV corresponds to a radius of any of the theoretical radio coverage areas of any of the first, second and third wireless communication units. According to some embodiments the radius is the shortest radius of any of the theoretical radio coverage areas of any of the first, second and third wireless communication units.

Figure 3B:
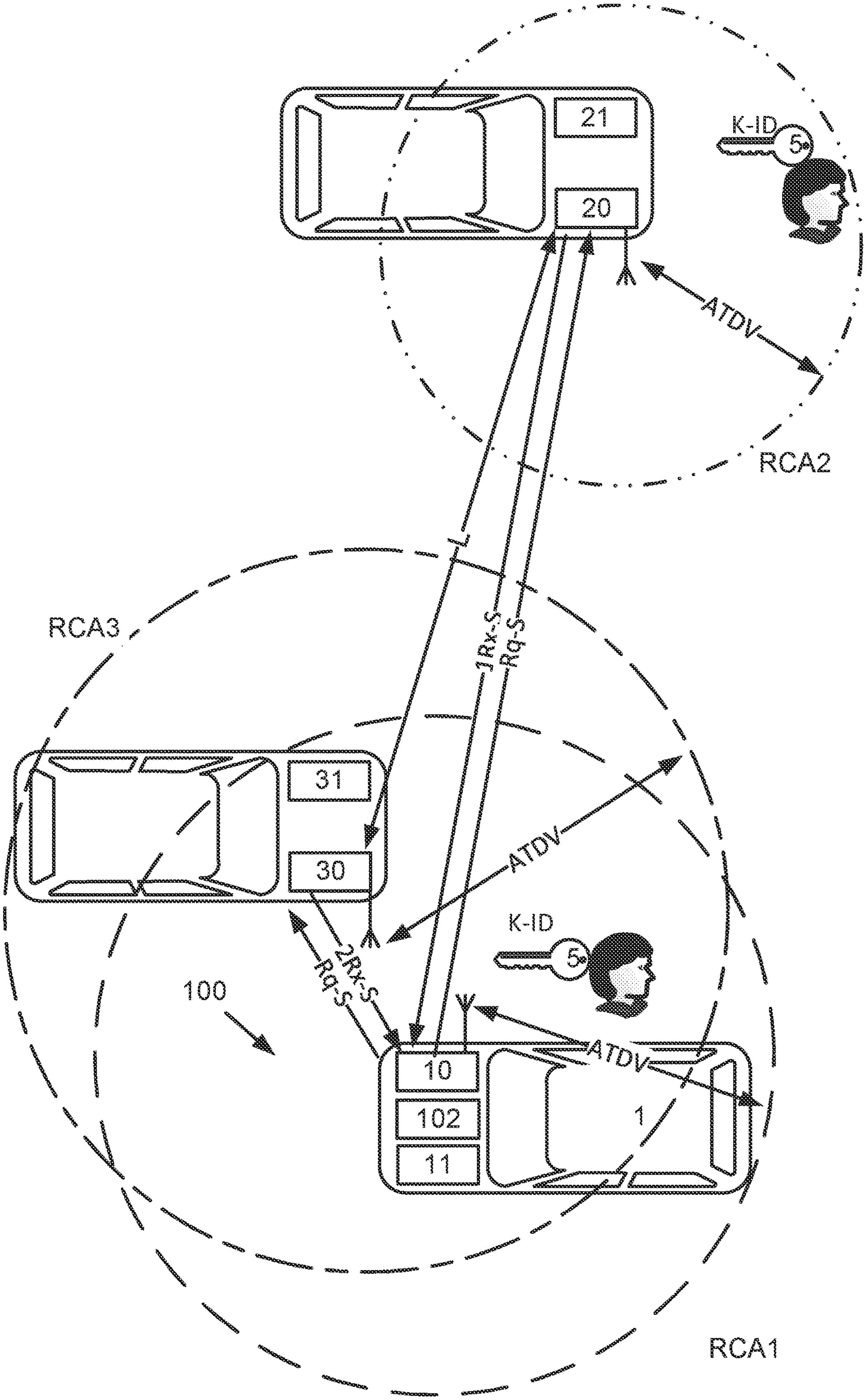
FIG. 3B illustrates an example access system for managing access to a vehicle for preventing fraud by duplication of a wireless key according to some embodiments of the present disclosure.

FIG. 3B illustrates an example access system for managing access to a vehicle for preventing fraud by duplication of a wireless key according to some embodiments of the present disclosure.

In the illustration of FIG. 3B the wireless key 5 is determined to be in the vicinity of the second wireless communication unit 20 and that the wireless key 5 is also in the vicinity of the third wireless communication unit 30. However the distance L between the second wireless communication unit 20 and the third wireless communication unit 30 exceeds the possibility for the wireless key 5 to be within the predetermined acceptable threshold distance value ATDV that is in the illustrative example of FIG. 3B set to the shortest radius of any of the circles defining the theoretical radio coverage area RCA of any of the first, second and third wireless communication units.

In the example it would hence be acceptable if the wireless key 5 was determined to be in the vicinity of the first wireless communication unit 10 and that the wireless key 5 was also in the vicinity of the first wireless communication unit 10 but in the overlapping areas of the theoretical radio coverage areas of the first wireless communication unit 10 and the second wireless communication unit 20.

One advantage with this embodiment is that fraud can be detected since it is determined that more than one wireless key seems present, e.g. due to an attempted signal duplication, and thereby avoid giving access to an intruder.

According to some embodiments the warning signal indicative of duplication of the wireless key 5 issues an alarm of the vehicle 1. According to some embodiments the warning signal indicative of duplication of the wireless key 5 issues a lock of the vehicle for a predetermined time before unlock is allowed. According to some embodiments the warning signal indicative of duplication of the wireless key 5 issues a notification to a trusted device associated with the access system 100.

According to some embodiments the first wireless communication unit 10 is configured to re-establish wireless communication with the second wireless communication unit 20 within a predetermined time period from previous establishment of wireless communication with the second wireless communication unit 20, and receive a further response signal 1Rx-S to manage access to the vehicle 1.

Figure 4:
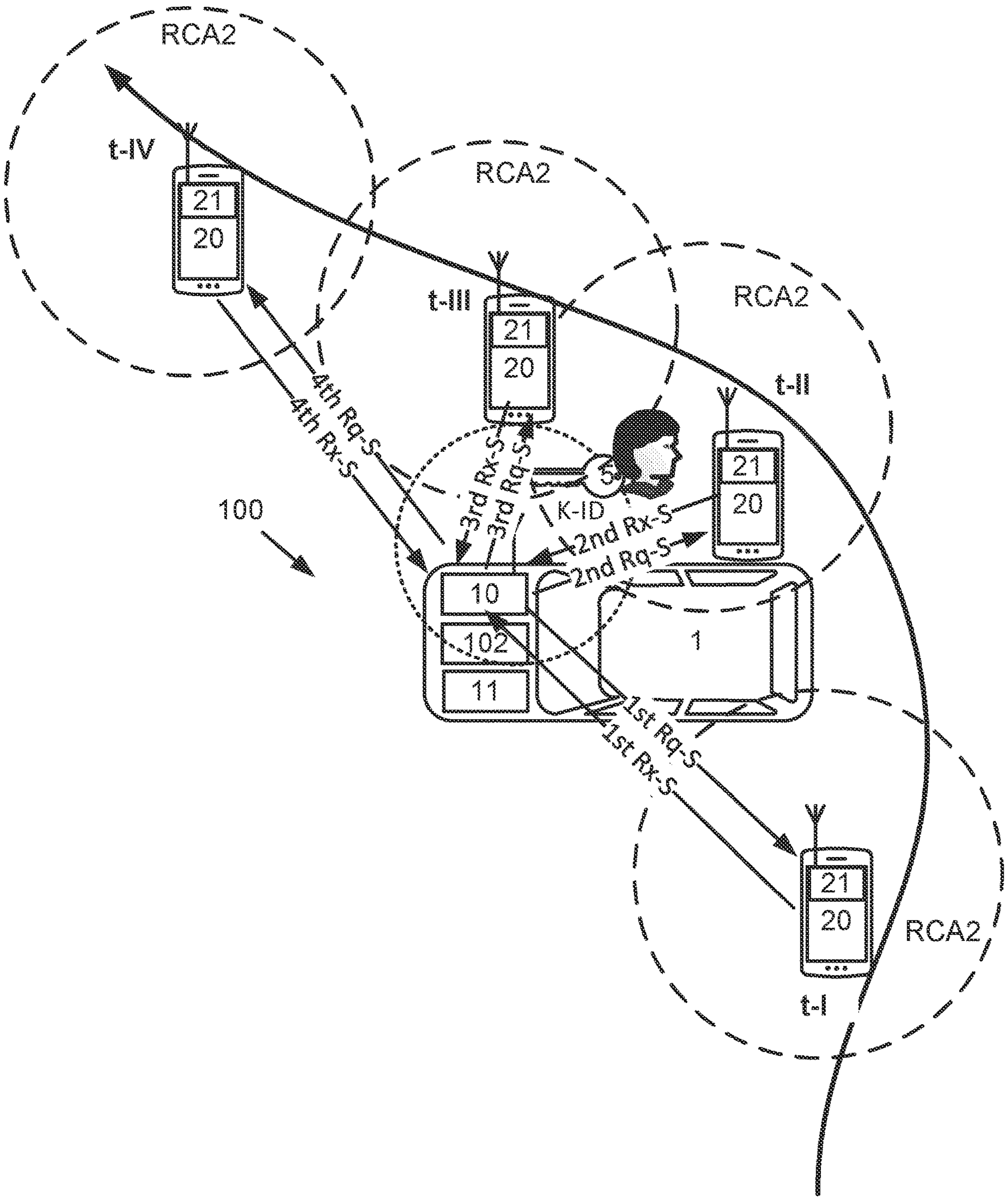
FIG. 4 illustrates an example access system for managing access to a vehicle by a first wireless communication unit establishing and re-establishing wireless communication with a second wireless communication unit according to some embodiments of the present disclosure.

FIG. 4 illustrates an example access system 100 for managing access to a vehicle 1 by a first wireless communication unit 10 establishing and re-establishing wireless communication with a second wireless communication unit 20 according to some embodiments of the present disclosure. In the illustration, the second wireless communication unit 20 is a smartphone that is worn by a person that is moving in the vicinity of the vehicle.

In the example illustration of FIG. 4, the first wireless communication unit 10 establishes wireless communication with a second wireless communication unit 20 at a first time t-I. At the first time t-I the 1st response signal Rx-S is indicative of no presence of the wireless key 5 within the radio coverage area RCA2 of the second wireless communication unit 20.

The first wireless communication unit 10 re-establishes wireless communication with the second wireless communication unit 20 at a second time t-II. At the second time t-II the 2nd response signal Rx-S is indicative of presence of the wireless key 5 within the radio coverage area RCA2 of the second wireless communication unit 20.

The first wireless communication unit 10 re-establishes wireless communication with the second wireless communication unit 20 at a third time t-III. At the third time t-III the $3^{rd}$ response signal Rx-S is indicative of presence of the wireless key 5 within the radio coverage area RCA2 of the second wireless communication unit 20.

The first wireless communication unit 10 re-establishes wireless communication with the second wireless communication unit 20 at a fourth time t-IV. At the fourth time t-IV the $4^{th}$ response signal Rx-S is indicative of no presence of the wireless key 5 within the radio coverage area RCA2 of the second wireless communication unit 20.

An example use case is a family gone shopping and the parent with the wireless key 5 in a pocket is carrying heavy shopping bags in both hands and the vehicle will not unlock.

However, a family member has a trusted device in form of a smartphone in the pocket and the family member is running around the vehicle which supports the unlocking of the vehicle according to the above embodiment.

According to some embodiments the access to the vehicle can be managed based on the presence of the wireless key 5 within the radio coverage area of the first wireless communication unit 10 and/or the second wireless communication unit 20 over a predetermined time period.

One advantage with this embodiment is that multiple response signals can be used for determining presence of the wireless key 5 within the radio coverage area of the first wireless communication unit 10 and/or the second wireless communication unit 20 over time which is useful if the second wireless communication unit 20 is moving in relation to the first wireless communication unit 10 and in relation to the wireless key 5.

Figure 5:
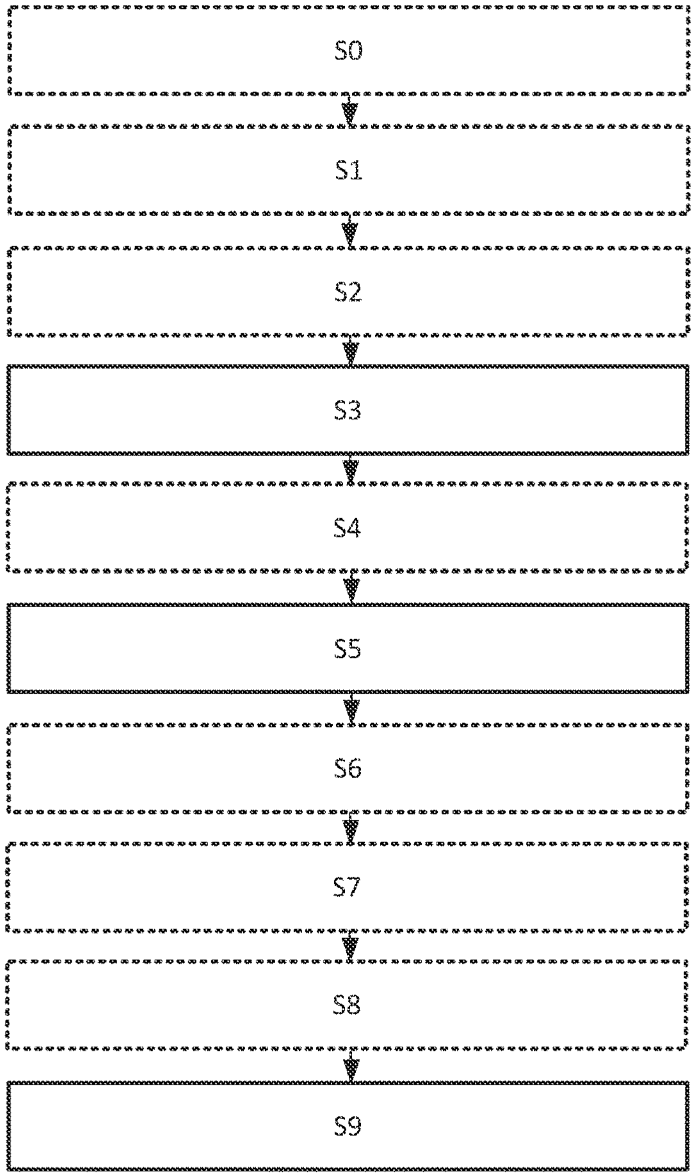
FIG. 5 illustrates a flow chart of the method steps according to the second aspect of the disclosure.

FIG. 5 illustrates a flow chart of the method steps according to the second aspect of the disclosure.

The second aspect of this disclosure shows a method for managing access to a vehicle 1, the method comprising the step of S3 establishing, by the first wireless communication unit 10, wireless communication with a second wireless communication unit 20 arranged remote from the vehicle 1, the step of S5 receiving, by the first wireless communication unit 10, a response signal 1Rx-S indicative of the presence of the wireless key 5 within the radio coverage area of the second wireless communication unit 20, and the step of S9 managing access to the vehicle 1 based on the presence of the wireless key 5 within the radio coverage area of the first wireless communication unit 10 and/or the second wireless communication unit 20.

One advantage with this second aspect is that in a determination that the wireless key 5 is within the radio coverage area of the second wireless communication unit 20, the access system 100 can manage access to the vehicle 1 based on the fact that the wireless key 5 is within the radio coverage area of the second wireless communication unit 20.

According to some embodiments the method further comprises the step of S1 detecting a presence of a wireless key 5 within a radio coverage area of a first wireless communication unit 10.

One advantage with this embodiment is that it can be established that a wireless key 5 is within a radio coverage area of the first wireless communication unit 10 and hence within a certain distance from the vehicle 1 based on the characteristics of the radio communication interface of the first wireless communication unit 10.

According to some embodiments the method further comprises the step of S8 determining the position of the wireless key 5 relative to the first wireless communication unit 10 and relative to the second wireless communication unit 20 arranged remote from the vehicle 1.

One advantage with this embodiment is that a relative position of the wireless key 5 based on the location of the first wireless communication unit 10 and the second wireless communication unit 20 can be determined based on the characteristics of the radio communication interface of the first and second wireless communication units.

According to some embodiments the method further comprises the step of S2 determining a wireless key identity K-ID of the wireless key 5, and the step of S4 sending, from the first wireless communication unit 10 to the second wireless communication unit 20, a request signal Rq-S indicative of the wireless key identity K-ID of the wireless key 5 to determine the presence of the wireless key 5 within a radio coverage area of the second wireless communication unit 20.

One advantage with this embodiment is that it can be determined if the wireless key 5, with the certain wireless key identity K-ID, is within the radio coverage area of the second wireless communication unit 20 which is an indication that the wireless key 5, with the certain wireless key identity, is in the vicinity of the second wireless communication unit 20.

According to some embodiments the method further comprises the step of S0 determining the geographical position of the first wireless communication unit 10 by the first global positioning system unit 11, the step of S6 receiving, via the response signal Rx-S, data indicative of the geographical position of the second wireless communication unit 20, and the step of S7 determining the position of the wireless key 5 based on the geographical position of the first wireless communication unit 10 and the geographical position of the second wireless communication unit 20, and based on the presence of the wireless key 5 being within the radio coverage area of the first wireless communication unit 10 and the second wireless communication unit 20.

One advantage with this embodiment is that it can be determined that the wireless key 5 is within a certain distance from the vehicle 1 based on the radio coverage area of the first wireless communication unit 10 and the second wireless communication unit 20 based on the characteristics of the radio communication interface of the first and second wireless communication units, and together with the information about the geographical positions of the first and second wireless communication units it can be further determined where the radio coverage areas of the first wireless communication unit 10 and the second wireless communication unit 20 intersects and overlaps.

Figure 6:
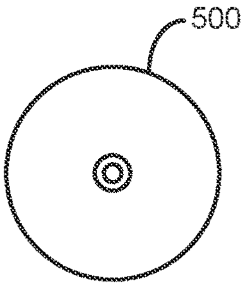
FIG. 6 illustrates a computer program product according to the third aspect of the disclosure.

The third aspect of this disclosure, illustrated in FIG. 6, shows a computer program product 500 comprising a non-transitory computer readable medium, having thereon a computer program comprising program instructions, the computer program being loadable into a processing circuitry 102 and configured to cause execution of the method according to the second aspect when the computer program is run by the processing circuitry 102.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

What is claimed is:

1. An access system for managing access to a vehicle, the access system comprises:

a first wireless communication unit arranged at the vehicle configured to detect a wireless key via a radio communication interface, a processing circuitry connected to the first wireless communication unit, and configured to manage access to the vehicle by causing the access system to:

establish, by the first wireless communication unit, wireless communication with a second wireless communication unit arranged remote from the vehicle;

receive, by the first wireless communication unit, a response signal indicative of the presence of the wireless key within a radio coverage area of the second wireless communication unit; and manage access to the vehicle based on the presence of the wireless key within a radio coverage area of the first wireless communication unit and/or the radio coverage area of the second wireless communication unit, and wherein the processing circuitry is further configured to identify fraud by duplication by causing the access system to:

determine that a duplicate device having an identity value that is the same as an identity value of the wireless key is in a coverage area of a third wireless communication unit;

determine that a distance between the second and third wireless communication units is larger than outside-a predetermined acceptable threshold distance value, the acceptable threshold distance value being a radius of the radio coverage area of one of the first, second, or third wireless communications units; and issue a warning signal indicative that the duplicate device is a duplication of the wireless key upon making the determination that the distance between the second and third wireless communication units is larger than the predetermined acceptable threshold distance value.

2. The access system according to claim 1, wherein the presence of the wireless key within the radio coverage area of the first wireless communication unit and/or the second wireless communication unit is based on radio signal strength data.

3. The access system according to claim 1, wherein the processing circuitry is further configured to cause the access system to:

detect the presence of the wireless key within the radio coverage area of the first wireless communication unit.

4. The access system according to claim 1, wherein the processing circuitry is further configured to cause the access system to:

determine the position of the wireless key relative to the first wireless communication unit and relative to the second wireless communication unit arranged remote from the vehicle.

5. The access system according to claim 1, wherein the processing circuitry is further configured to cause the access system to:

determine a wireless key identity of the wireless key; and send, from the first wireless communication unit to the second wireless communication unit, a request signal indicative of the wireless key identity of the wireless key to determine the presence of the wireless key within the radio coverage area of the second wireless communication unit.

6. The access system according to claim 1, wherein the access system further comprises:

a first global positioning system unit arranged at the vehicle configured to determine the geographical position of the first wireless communication unit, and the processing circuitry is further configured to cause the access system to:

determine the geographical position of the first wireless communication unit by the first global positioning system unit;

receive, via the response signal, data indicative of the geographical position of the second wireless communication unit; and determine the position of the wireless key based on the geographical position of the first wireless communication unit and the geographical position of the second wireless communication unit, and based on the presence of the wireless key being within the radio coverage area of the first wireless communication unit and the second wireless communication unit.

7. The access system according to claim 1, wherein the processing circuitry is further configured to cause the access system to:

establish, by the first wireless communication unit, wireless communication with plural wireless communication units arranged remote from the vehicle; and receive, by the first wireless communication unit, plural response signals indicative of the presence of the wireless key within the radio coverage area of the plural wireless communication units arranged remote from the vehicle; and determine the position of the wireless key relative to the first wireless communication unit and relative to the plural wireless communication units arranged remote from the vehicle.

8. The access system according to claim 1, wherein the first wireless communication unit is configured to re-establish wireless communication with the second wireless communication unit within a predetermined time period from previous establishment of wireless communication with the second wireless communication unit, and receive a further response signal to manage access to the vehicle.

9. A method for managing access to a vehicle, the method comprising:

managing access to the vehicle by:

establishing, by a first wireless communication unit, wireless communication with a second wireless communication unit arranged remote from the vehicle;

receiving, by the first wireless communication unit, a response signal indicative of the presence of a wireless key within a radio coverage area of the second wireless communication unit; and managing access to the vehicle based on the presence of the wireless key within a radio coverage area of the first wireless communication unit and/or the radio coverage area of the second wireless communication unit, and identifying fraud by duplication by:

determining that a duplicate device having an identity value that is the same as an identity value of the wireless key is in a coverage area of a third wireless communication unit;

determining that a distance between the second and third wireless communication units is larger than a predetermined acceptable threshold distance value, the acceptable threshold distance value being a radius of the radio coverage area of one of the first, second, or third wireless communications units; and issuing a warning signal indicative that the duplicate device is a duplication of the wireless key upon making the determination that the distance between the second and third wireless communication units is larger than the predetermined acceptable threshold distance value.

10. The method according to claim 9 further comprising:

detecting a presence of a wireless key within a radio coverage area of a first wireless communication unit.

11. The method according to claim 9, further comprising:

determining the position of the wireless key relative to the first wireless communication unit and relative to the second wireless communication unit arranged remote from the vehicle.

12. The method according to claim 9, further comprising:

determining a wireless key identity of the wireless key; and sending, from the first wireless communication unit to the second wireless communication unit, a request signal indicative of the wireless key identity of the wireless key to determine the presence of the wireless key within the radio coverage area of the second wireless communication unit.

13. The method according to claim 9, further comprising:

determining the geographical position of the first wireless communication unit by the first global positioning system unit;

receiving, via the response signal, data indicative of the geographical position of the second wireless communication unit; and determining the position of the wireless key based on the geographical position of the first wireless communication unit and the geographical position of the second wireless communication unit, and based on the presence of the wireless key being within the radio coverage area of the first wireless communication unit and the second wireless communication unit.

14. A non-transitory computer readable medium, having stored thereon a computer program comprising program instructions, the computer program being loadable into a processing circuitry and configured to cause execution of the method according to claim 9 when the computer program is run by the processing circuitry.

* * * * *